United States Patent [19]

Davis

[11] Patent Number: 4,499,665
[45] Date of Patent: Feb. 19, 1985

[54] COURSE CORRECTION CALCULATOR

[76] Inventor: Randall C. Davis, 115 N. Lawson Rd., Poquoson, Va. 23662

[21] Appl. No.: 449,605

[22] Filed: Jan. 27, 1983

[51] Int. Cl.³ .............................................. G01C 21/20
[52] U.S. Cl. ................................... 33/1 SB; 33/1 B; 33/431; 33/457; 33/482
[58] Field of Search .............. 33/1 B, 1 C, 1 SD, 457, 33/431, 476, 482, 1 SB

[56] References Cited

U.S. PATENT DOCUMENTS

| | | | |
|---|---|---|---|
| 1,667,191 | 4/1928 | Chapin | 33/476 |
| 2,004,951 | 6/1935 | Jensen | 33/431 |
| 2,019,708 | 11/1935 | Jones | 33/457 |
| 2,026,537 | 1/1936 | Jensen | 33/431 |
| 4,138,817 | 2/1979 | Frost et al. | 33/1 SD |

Primary Examiner—William D. Martin, Jr.
Attorney, Agent, or Firm—Stevens, Davis, Miller & Mosher

[57] ABSTRACT

A novel course correction calculator, consisting of a sheet of transparent material 1 with inscribed reference line 2, centering points 3 and 4, radial lines 5 and 6, circular arcs 7 and circles 8, is provided whereby a heading correction and a speed correction factor for true speed can be obtained quickly and easily by a navigator for a small boat, vessel or aircraft, that offsets the effects caused by the motion of the medium through which the craft is traveling, such as tide or wind. The ratio of the speed of the medium to the speed of the craft through the medium and the direction in which the medium is moving are used with the invention to obtain a heading correction and a speed correction factor for true speed to offset the effects that the moving medium has on the path of travel for the craft. This invention provides a rugged, inexpensive, easy to use tool for the navigation of small boats, vessels and aircraft. The invention is of one piece construction, is easier to use, is independent of units used for speed, gives quicker results, and is more durable than prior art for determining these corrections.

5 Claims, 6 Drawing Figures

COURSE CORRECTION CALCULATOR

ORIGIN OF THE INVENTION

The invention described herein was made by a citizen of the United States in the pursuit of improving navigational skills relating to the navigation of sailboats in coastal and inland waters.

BACKGROUND OF THE INVENTION

The present invention relates generally to the navigation of all manner of small boats, vessels and aircraft, herein called craft. As a boat is propelled and steered through the water, it moves with respect to the water. At the same time, the water may be moving with respect to the bottom and the shore as a result of a current. Likewise, an aircraft moves through the air which in turn may be moving with respect to the ground. The resultant motion of the craft is the net effect of these two motions combined, with regard to both direction and speed. The actual path over the bottom will not be the same as the heading steered, neither in terms of direction nor speed.

Persons conversant with the art to which the invention pertains are aware that navigation of such craft must take into account the offsetting influences that cause the actual path of the craft to diverge from the path steered. The offsetting influences for boats include tidal currents, oceanic currents and river currents. For aircraft, the offsetting influences include air currents and winds. For boats it is customary to use the direction into which the current is going; a Southerly current for example is flowing toward the South. For aircraft it is customary to use the direction from which the current is coming; a Northerly wind for example is coming from the North, but is flowing toward the South. These accepted usages must be considered in the design of navigational tools.

The influence of currents in the water or air, herein called the medium, can be a major factor in the navigation of these craft. The extent of the effect of these offsetting influences will vary widely with the relative speed of the current to the speed of the craft through the medium. For both types of craft, the navigational problem is the same. The navigator must obtain a correction to the heading of the craft relative to North and a true speed over the ground to offset the diverging influence of currents to properly navigate the craft from one point on the Earth to another. These navigational corrections can be determined from the speed of the craft through the medium, the strength of the current or speed at which the medium is moving relative to the ground, and the angle between the desired direction of travel and the direction of movement of the medium. The desired correction to the heading and a speed correction factor for true speed can be determined from this known information by a unique instrument incorporated in the present invention.

Prior art methods of finding a heading correction and computation of true speed, for navigating a craft to offset the influence of tide or wind, include tables, formulas solved by calculations, drawing vector diagrams, various types of multi-piece sliding calculators, and electronic calculators. Prior art has the shortcomings of being time consuming, or require involved computational skills, or require the use of complex equipment, or require external power sources in order to obtain heading and speed corrections. Further, the methods, tables and equipment for obtaining such corrections by prior art are expensive or difficult to replace and easily damaged or destroyed by the nature of the adverse environment sometimes found on small boats, vessels and aircraft. Because of the time required, or the difficulty of use, or the delicacy of the tools needed, obtaining heading and speed corrections by prior art methods is not always carried out under adverse conditions where such corrections are most needed. Further prior art often has the disadvantage of being set up for one system of units for speed and thus are of little use if a different set of units are selected by the navigator.

Accordingly, it is an objective of the present invention to provide an instrument that is quicker and easier to use than prior art for finding a correction to the heading and for determining the true speed of a craft to offset the influences caused by the motion of the medium through which the craft is moving. Another objective of the invention is to provide a rugged instrument of one piece construction with no moving parts that will not be easily damaged by the adverse conditions under which it may be used. Another objective of the invention is to provide an instrument that can be used for any set or range of units for speed. Another objective of the invention is to provide an instrument that is small, inexpensive and well suited for use on small craft where space and cost are important considerations. Another objective of the invention is to provide an inexpensive instrument that may also be used as a standard drawing triangle or straight edge by the navigator in the performance of his other duties.

The foregoing and other objectives of the present invention are obtained by constructing a unique and novel inscription of lines, circles and circular arcs on a thin sheet of transparent material, such as plastic, acrylic or other material having properties suitable for the objectives of the invention.

The principles used to construct the invention are now discussed. Geometrically, the craft speed through the medium may be equated to one unit of length on any convenient linear scale. The ratio of the speed of the tide or wind to the craft speed will then correspond to a segment of length of this unit scale. The angle between the direction of movement of the tide or wind and the intended direction of the craft will provide an angle. The unit length and the segment length and the angle constitutes two known sides and an angle of a triangle. From elementary trigonometry, the law of cosines and the law of sines may be used to find the remaining side and two angles of the triangle. By this mathematical principle, operation of the invention gives the heading correction angle and the speed correction factor for a craft to offset the effects caused by the motion of a tide or wind. On a logarithmic scale the product of two numbers is represented as the sum of two segments of the logarithmic scale. The ratio of two numbers is represented as the difference of two segments of the logarithmic scale. By this mathematical principle, operation of the invention gives the ratio of tide or wind speed to craft speed and the product of the speed correction factor times the craft speed.

BRIEF DESCRIPTION OF THE DRAWINGS

A more complete appreciation of the invention and many attendant advantages thereof will be more readily apparent as the same becomes better understood by reference to the following detailed description when considered in connection with the accompanying drawings wherein.

DETAILED DESCRIPTION OF THE DISCLOSURE

Figure 1:
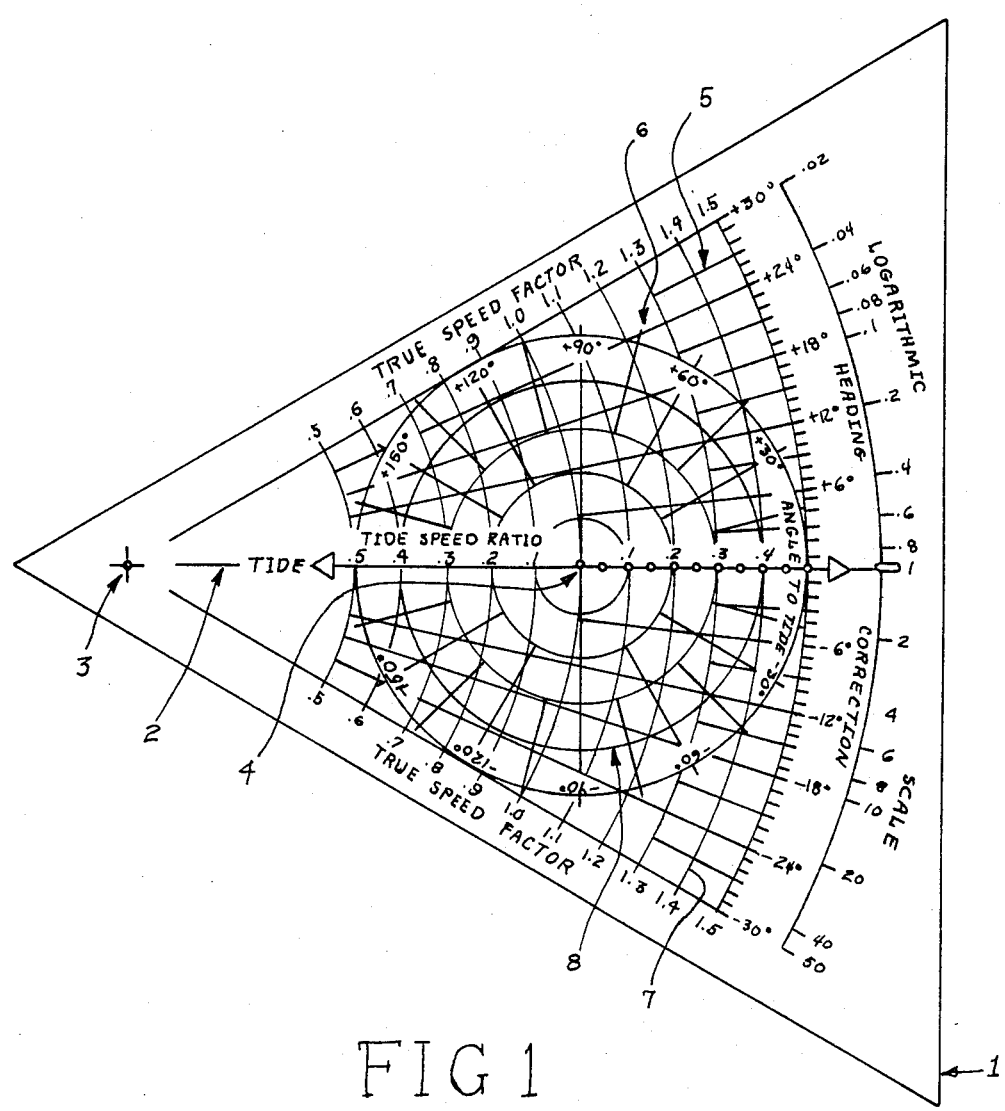
FIG. 1 is a plan view of the invention, near to actual size, showing a preferred embodiment of inscribed lines, circles and circular arcs.
Figure 2:
FIG. 2 is a view of a section through the thickness of the invention.

Referring now to the drawings, FIG. 1 illustrates a preferred embodiment of the present invention, generally indicated as plastic sheet 1. The plastic sheet 1 consists of a sheet of transparent material such as plastic or acrylic. The reference line 2 is inscribed across the middle of the sheet 1. The point 3 is near the left end of the line 2 and the point 4 is inscribed about two thirds of the length of line 2 from point 3. The radial line 5 is a typical radial line of the set of radial lines emanating from point 3 above and below the line 2. The radial line 6 is a typical radial line of the set of radial lines emanating in all directions from point 4. The circular arc 7 is a typical circular arc of the set of circular arcs centered about point 3, extending above and below the line 2 and intersecting the line 2 on both sides of point 4. The circle 8 is a typical circle of the set of circles about point 4 intersecting the line 2 on both sides of point 4. The lines and arcs are inscribed or indented into the surface on the back side of the sheet 1. The indentions are sufficiently deep to hold and protect ink, paint or inlay from wear or damage and to make the lines and arcs clearly visible through the invention. FIG. 2 is a cross-sectional view through the sheet 1 along the reference line 2. The material is thick enough for strength to prevent excessive bending when using the invention, but is thin enough to easily use with a pencil for drawing.

Figure 3:
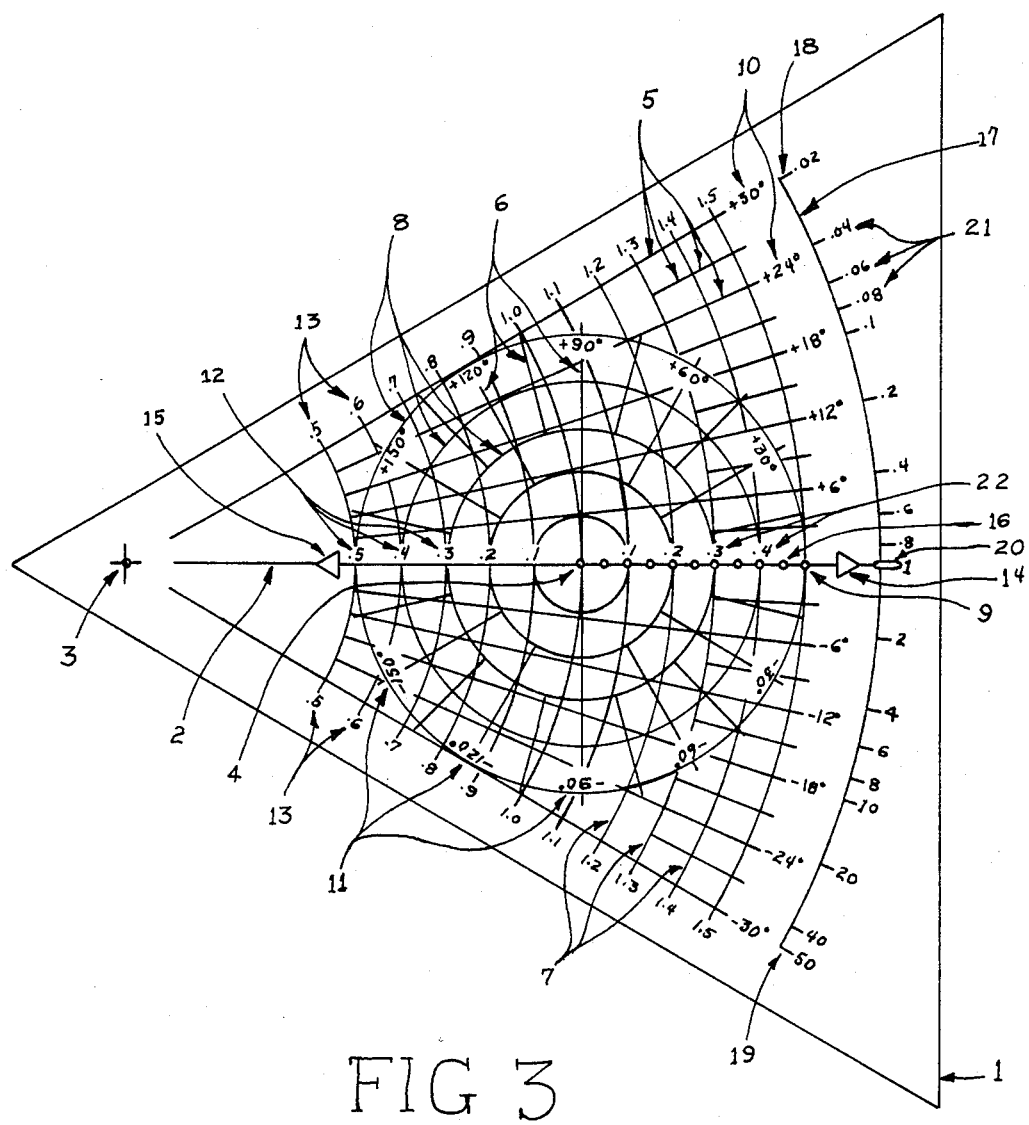
FIG. 3 is a plan view for showing various details of the invention.

Referring now to FIG. 3, the point 9 is near the right end of line 2. The angular scale 10, ranging in values from +30 degress to −30 degrees, is laid out for convenience on the rightmost of the arcs 7, above and below the line 2, and denotes the angle between the radial lines 5 and the reference line 2. A + angle is above line 2 and − is below line 2.

The angular scale 11, ranging in values from +180 degrees to −180 degrees is laid out on the outermost circle 8, and shows the angle of the radial lines 6 relative to the the segment of reference line 2 between point 4 and point 9. A + angle is above line 2 and a − angle is below line 2.

The linear scale 12, having values ranging from 0 to 0.5 is established by the intersection of the circles 8 with reference line 2 between point 3 and point 4. The values on the scale 12 located by the intersection of a circle 8 with line 2, represent the ratio of the radius of the circle 8 at the intersection to the distance between point 3 and point 4. Therefore the scale 12 has a value of zero at the point 4 and a value of 0.5 halfway between point 4 and point 3.

The arcs 7, intersecting the radial lines 5, and line 2, establish the linear scale 13 with values ranging from 0.5 to 1.5 as shown laid out on the uppermost of the radial lines 6 and again on the lowermost of the radial lines 6. The values on the scale 13, located at the intersection of an arc 7 with the radial lines 6, correspond to the ratio of the radius of the arc 7 at the intersection to the distance between point 3 and point 4. Thus the scale 13 has a value of unity for the arc 7 passing through the point 4, and a value of 0.5 halfway between point 4 and point 3.

A triangular hole 14 is made in the sheet 1 near the right end of reference line 2, to serve as a direction indicator and as a template for drawing a direction mark to indicate the intended direction of travel when using the invention.

A triangular hole 15 is made in the sheet 1 between point 3 and point 4 to serve as a direction indicator and as a template for drawing a direction mark to indicate the direction in which the tide is moving when using the invention.

Small circular holes are made in the sheet 1 at the point 3 and at the point 4, suitable for passing a pencil point through the sheet 1.

A series of small circular holes, of which hole 16 is a typical hole, are made through the sheet 1 on the line 2, between point 4 and point 9 at the intersection points of circles 8 with line 2 and mid way between, to serve as templates for marking a point when using the invention.

A linear scale 22, with values ranging from 0 to 0.5, is established by the intersections of circles 8 with reference line 2 between point 4 and point 9. The values of scale 22 represent the ratio of the radius of the circle 8 at the intersection to the distance between point 3 and point 4 and each of the holes 16 will have a value associated with scale 22.

The circular arc 17 centered about the point 3 is laid out a convenient distance to the right of the scale 10, and extends an equal angular distance on either side of the reference line 2. The upper end 18 and the lower end 19 of the arc 17 are at equal distances from the midpoint 20 of the arc 17. The logarithmic scale 21, with values ranging from 0.02 to 50, is laid out along the arc 17. The value of unity of the logarithmic scale lies at the midpoint 20 of arc 17. A value of two hundreths lies at the upper end 18 and a value of fifty lies at the lower end 19. An elongated opening is made in the sheet 1 at the midpoint 20, suitable for passing the point of a pencil through the sheet 1 to make a short straight mark.

The cross-sectional view through the sheet 1 in FIG. 2 shows the holes at point 3, point 4, and point 9 and the series of holes 16 with tapered walls for accommodating the point of a pencil. Also shown are the triangular openings 14 and 15 and the elongated hole 20.

Figure 4:
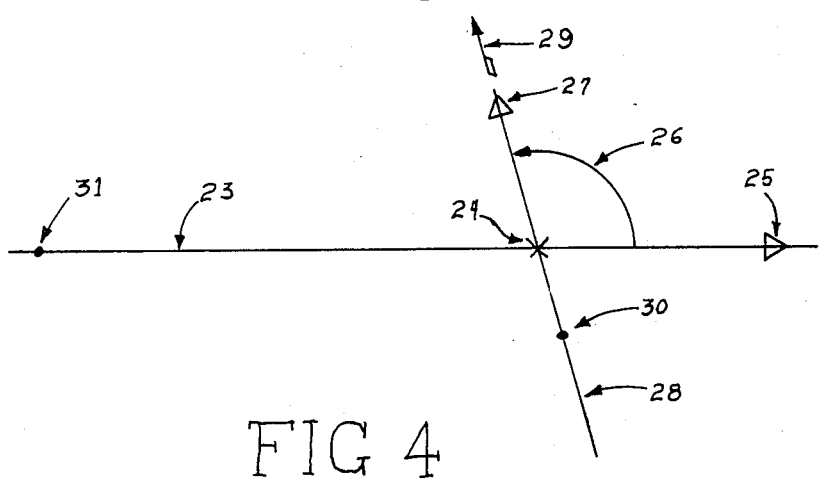
FIG. 4 is a drawing for showing by way of an example how the invention is used to obtain a heading correction and a speed correction factor for a craft being offset from its intended course by the movement of a tide.

The manner in which scales 10, 11 and 12 and 13 are used to obtain heading and speed corrections is now explained and can be better understood by referring to FIG. 4. The straight line 23 represents the desired heading or course for the craft as it is drawn or laid out in use on a piece of paper, chart or other suitable surface. The mark 24 is arbitrarily made on the line 23 and the point 4 on the sheet 1 is placed over the mark 24. A pencil point is inserted in the hole at point 4, onto the mark 24, securely establishing a rotation point for the plastic sheet 1 about the mark 24. The plastic sheet 1 is rotated about the pencil point until the reference line 2 on the plastic sheet 1 lies along and above the line 23 on the paper as seen through the transparent material of the plastic sheet 1. The template hole 14 is used to make the mark 25, establishing the desired direction of travel on the paper, to the right of mark 24 for example in FIG. 4.

The angle between the desired direction of travel and the direction in which the tide is moving is known by the navigator. This angle is now used to establish a line for the direction of movement of the tide relative to the line 23 on the paper. For the example in FIG. 4, the tide is known to be moving from right to left of the desired heading. Therefore, in FIG. 4 the direction in which the tide is moving will be shown as being to the left of the course line 23. The known angle between the desired heading and the direction in which the tide is moving is now located on the scale 11 of the invention. A + angle value on the scale 11 is for a tide moving from left to right relative to the desired heading and a − angle value is for a tide moving from right to left relative to the desired heading. For the example in FIG. 3, the known angle is the angle 26 and has a − value on scale 11.

The sheet 1 is now rotated, clockwise in this example, about the mark 24 until the desired negative angle 26 on scale 11 is aligned with the portion of line 23 to the left of mark 24 as seen through the transparent material of the sheet 1. The sheet 1 is held firmly in place and the pencil removed from the hole at point 4 and inserted into the opening 15. A mark 27 is made using the opening 15 as a template to establish line 28 passing through the mark 24 and the mark 27 and to indicate the direction of motion of the offsetting tide. The arrow 29 is drawn in FIG. 4, for convenience of explaining the example, on the line 28 to show the direction of travel of the tide.

The ratio of the tide speed to the speed of the craft, known by the navigator, is now located on the scale 12 between point 3 and point 4 on the sheet 1. Continuing from the position that the sheet 1 was in when the mark 27 was made, the sheet 1 is now slid without rotation along line 28, away from the mark 24, until the desired speed ratio on scale 12 is directly over the mark 24, seen through the invention. In this position the hole at point 4 is over the line 28 on the opposite side of line 23 from mark 27, and the reference line 2 of the sheet 1 is aligned with the line 28 through the sheet 1. The sheet 1 is now held firmly in place and the pencil point is inserted into the hole at point 4 to mark the new rotation point 30 on line 28. The sheet 1 is now counter-rotated, opposite to the rotation for angle 26, about the point 30 until the point 3 on the sheet 1 lies over the portion of course line 23 to the left of mark 24 as seen through the sheet 1. The mark 31 is made with a pencil through the hole at point 3. In this position, point 3 of the sheet 1 is over mark 31 and point 4 is over the mark 30. The sheet 1 is held firmly in place and the intersection of the course line 23, seen through the sheet 1, with the scale 10 is used to get a heading correction angle in degrees from scale 10, a + angle correction for the example in FIG. 4. A + correction angle from scale 10 is added to the craft heading (a − correction would be subtracted from the craft heading). The mark 24, seen through the sheet, will now occupy a position relative to the arcs 7 by lying on an arc 7 or between two arcs 7. This position of the mark 24 relative to the arcs 7 determines a value which can be read on the scale 13 by interpolation (extending an imaginary arc from the mark 24 to the scale 13). This value from scale 13, less than 1.0 for the example in FIG. 4, is the speed correction factor, which when multiplied by the speed of the craft through the water, gives the true speed of the craft relative to the ground.

Figure 5:
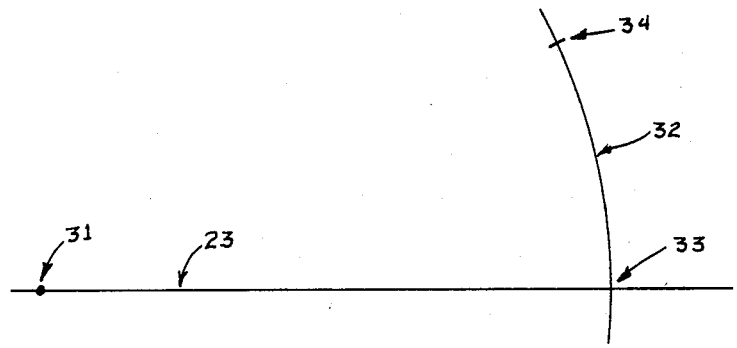
FIG. 5 is a drawing for showing by way of an example how the invention is used to obtain a ratio of tide speed to craft speed.

The manner in which scale 21 is used to find the ratio of tide speed to craft speed is now explained and can be better understood by referring to FIG. 5. Straight line 23 represents the desired heading for the craft as used in FIG. 4. The sheet 1 is laid down over the line 23 and line 2 is aligned with the line 23 seen through the sheet, so that the hole at point 3 lies near the left end of the line 23. The mark 31 near the left end of line 23 is aligned with the hole at point 3. A pencil point is placed in the hole at point 3 onto the mark 31 to center the sheet for a rotation. The sheet 1 is now rotated, with arc 17 tracing a path indicated by the arc 32 in FIG. 5, until the value of the craft speed on scale 21 is aligned with the line 23 seen through the sheet at the intersection point 33. The sheet is held firmly in place and a short straight mark 34 is made through the opening 20. The sheet 1 is again rotated about the mark 31 until the value of the current speed on scale 21 is aligned with the line 23 seen through the sheet at the intersection point 33. The sheet is held firmly in place and the ratio of tide speed to craft speed is read off the scale 21 at the mark 34 seen through the sheet. Should values of craft speed and current speed be greater or larger than the numbers appearing on the logarithmic scale, both may be divided or multiplied by ten, any number of times, until speed numbers are obtained that are on the scale. Their ratio, of course, if not affected by this operation.

Figure 6:
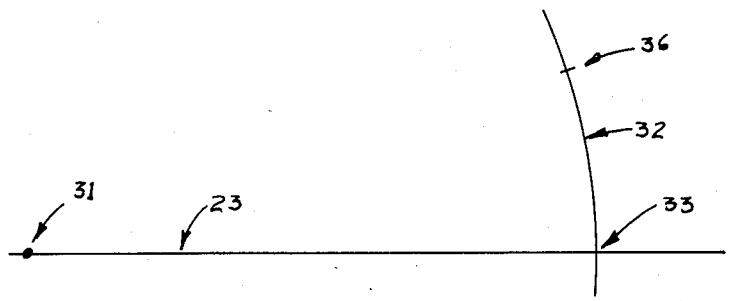
FIG. 6 is a drawing for showing by way of an example how the invention is used to obtain a true speed as the product of the speed correction factor times craft speed.

The manner in which the scale 21 is used to find the true speed from the speed correction factor and the craft speed is now explained and can be better understood by referring to FIG. 6. Straight line 23 represents the desired heading for the craft and point 33 the intersection point of line 23 and arc 32 as used in FIG. 5. The sheet 1 is laid down over the line 23 and line 2 is aligned with the line 23 seen through the sheet so that the hole at point 3 lies on line 23 near the left end. The mark 31 near the left end of line 23 is aligned with the hole at point 3. A pencil point is placed in the hole at point 3 onto the mark 31 to center the sheet for rotation. The sheet is now rotated about the mark 31 until the desired value of the craft speed on scale 21 lies over the line 23 seen through the sheet. The sheet is held firmly in place and the short straight mark 36 is made through the opening 20. The sheet 1 is again rotated about the mark 31 until the desired value of the speed correction factor on scale 21 is positioned directly over the mark 36 seen through the sheet 1. The invention is held firmly in place and the value of true speed over the ground for the craft is read off scale 21 at the intersection point 33 with the line 23 seen through the sheet. If the craft speed has been divided or multiplied by ten, then the true speed must also be divided or multiplied by ten.

It is thus seen that the present invention provides a new and novel instrument suitable for determining heading corrections, speed correction factors, and true speed for navigating a variety of craft. The invention provides an easy to use, quick and accurate means of obtaining the corrections needed to offset the effects of the movement of the tide on the path of travel for the craft. It is seen that the invention is rugged and durable, and of a size and shape suitable for use in the adverse environment sometimes associated with navigation of a small boats, vessels, or aircraft. It is seen that the invention is of one piece construction and can be made of an inexpensive material and requires no external power source or tables for obtaining corrections. Finally it is seen that the invention can be used for any units or range of speed that the navigator may choose.

Although the invention has been described relative to the specific embodiments thereof, these are to be considered exemplary only and not limiting. The shape of the invention is not restrictive with a circular shape, a rectangular shape, or any shape with any number of sides being possible. The invention is not restricted in physical size and could be made in any size or thickness convenient for use by the navigator. The invention has been described for a specific speed ratio scale 12 ranging from 0 to 0.5, in 0.1 increments, however any other scale with any other increment size could be constructed. Similarly, the scale of course corrections 10 as described is from +30 degrees to −30 degrees, but could be constructed for any range and any size increments considered desirable. The range of the speed correction factor scale 13 as described is from 0.5 to 1.5, in increments of 0.1, but any range of values and increment size could be used. These changes in scale ranges and increments can be made by following the construction details in this disclosure.

The shape and size of the openings 14 and 15 are not limiting and the shape could be any convenient shape suitable to the navigator. With skill the navigator does not need these openings and they could be replaced on an alternate embodiment by marks only, or left off entirely.

An alternate embodiment to the invention pertains to the scale 22. The scale 12 can also be established on the either side of point 4 by the intersection of circles 8 with line 2. These intersection points of circles 8 with line 2 establish the same values on scale 22 as seen on scale 12 with respect to the ratio of circle radius and the distance from point 3 to point 4. At each scale 22 point between point 4 and point 9 and at suitable intervals in between, the small holes 16 in the invention can be used for passing the point of a pencil through the invention for marking a point. These holes 16 are used in the following way. Referring now to FIG. 4, the sheet 1 is laid over the line 23 as before, so that the hole at point 4 is over the mark 24, and line 2 lies over and along line 23 seen through the sheet. Upon rotating the sheet through the angle 26 as before, the holes 16 will be aligned with line 28 and a new rotation point 30 can be made immediately through one of the holes 16, without moving the sheet further, by selecting a hole 16 nearest to the value on scale 22 for the ratio of tide speed to craft speed. After the point 30 is made, the sheet 1 is moved, without rotation as before, so that the hole at point 4 is now over point 30. Just as before the sheet is counter-rotated until the point 3 lies over the line 23 and the heading correction angle and speed correction factor are read off the scales 10 and 13 as before.

This embodiemnt, although less accurate for large increments of scale 22 between holes 16, provides for more rapid use of the invention by eliminating the step of marking a line 28 with opening 15 and moving the point 4 along this line 28 to locate the new rotation point 30. However, by a suitable choice of physical size of the sheet 1 and closer spacing of the holes 16, the accuracy loss can be reduced to a any level tolerable for navigational purposes.

Another alternate embodiment would be to combine the alternate embodiment just described and the preferred embodiment in the use of the scale 12 and scale 22. In this embodiment scale 22 and the holes 16 could be used for quick correction determinations and the scale 12 could be used with point 4 for accurate correction determinations.

Another alternate embodiment pertains to changing the scale 11 to use the direction from which the moving medium is coming. The zero of scale 11 can be reversed, to lie on the reference line 2 between the point 4 and the point 3. The sign of the values of scale 11 are reversed so that − angles are above line 2 and + angles are below line 2. In the embodiment, the navigator uses the angle between the desired heading and the direction from which the tide or wind is coming. The sheet 1 is now rotated as before about point 4 until this angle on the new scale 11 lies over the heading line 23. The triangular opening 15 will point as before into the direction in which the medium is moving. The sheet is then moved along this direction against the direction of motion of the medium as before to find the new center for counter-rotation of the invention.

Another alternate embodiment pertains to the logarithmic scale 28. Any point could be used for constructing the scale on the sheet. Alternately, the logarithmic scale is not confined to an arc and could be laid out on a straight line on the sheet, whereby the sheet is slid along this line for finding ratios and products.

Another alternate embodiment pertains to the use of the materials that are not transparent. By a suitable choice of openings, the invention can be constructed of opaque materials, such as metal, whereby the desired corrections could be read through openings from suitable marks and lines adjacent to the scales as described above.

There are thus, numerous variations of the present invention that will be readily apparent to those skilled in the art in light of the above teachings without departing from the spirit and scope of the appended claims that the invention may be practised otherwise than as specifically described herein.

What is claimed as new and desired to be secured by Letters Patent of the United States is:

1. A course correction calculator for calculating a craft heading correction to account for craft drift due to movement with respect to the ground of a fluid medium in which said craft is moving, said fluid medium having a speed and direction of movement over the ground, said course correction calculator comprising:

an at least partially transparent substrate;

first means, associated with said substrate, for pivotally orienting said substrate with respect to a first point;

second means, associated with said substrate, for pivotally orienting said substrate with respect to a second point, wherein said first means and said second means are separated by a first line segment of a length representative of a ratio of fluid medium speed to craft speed of 1.00;

first arc segment means, associated with said substrate and having a center of curvature coincident with said first orienting means, for indicating varying ratios of fluid medium speed to craft speed where a fluid medium speed to craft speed ratio of 1.00 is indicated by a distance equal to said first line segment length;

second arc segment means, associated with said substrate and having a center of curvature coincident with said second orienting means, for indicating varying ratios of craft speed over the ground to craft speed in said fluid medium where a craft speed over the ground to craft speed in said fluid medium ratio of 1.00 is indicated by a distance equal to said first line segment length;

first angular scale means for indicating an angular relationship between said first line segment and a line between said first orienting means and a point not located on said first line segment; and second angular scale means for indicating an angular relationship between said first line segment and a line between said second orienting means and a point not located on said first line segment.

2. The course correction calculator according to claim 1, wherein said substrate is comprised of a transparent plastic.

3. The course correction calculator according to claim 2, wherein said first pivotally orienting means and said second pivotally orienting means are apertures in said substrate.

4. The course correction calculator according to claim 3, wherein said first arc segment means comprises a plurality of concentric circles on said transparent plastic substrate, where the radius of each circle indicates a ratio of fluid medium speed to craft speed, and said second arc segment means comprises a plurality of arc segments on said transparent plastic substrate where the radial distance from said second orienting means to one of said plurality of arc segments represents a ratio of craft speed over the ground to craft speed in said fluid medium.

5. The course correction calculator according to claim 4, wherein said first angular scale means comprises a plurality of first radial lines on said transparent plastic substrate, said first radial lines passing through said first orienting means and at varying angular relationships with said first line segment and said second angular scale means comprises a plurality of second radial lines on said transparent plastic substrate, said second radial line passing through said second orienting means and in varying angular relationships with said first line segment.

* * * * *